July 18, 1967   R. E. DE YOUNG   3,331,403
STATOR COIL WINDING AND POSITIONING MACHINE
Filed July 23, 1964   5 Sheets-Sheet 1

INVENTOR.
ROGER E. DE YOUNG
BY
Souther, Stoltenberg & Bass
ATTORNEYS

July 18, 1967  R. E. DE YOUNG  3,331,403
STATOR COIL WINDING AND POSITIONING MACHINE
Filed July 23, 1964  5 Sheets-Sheet 2
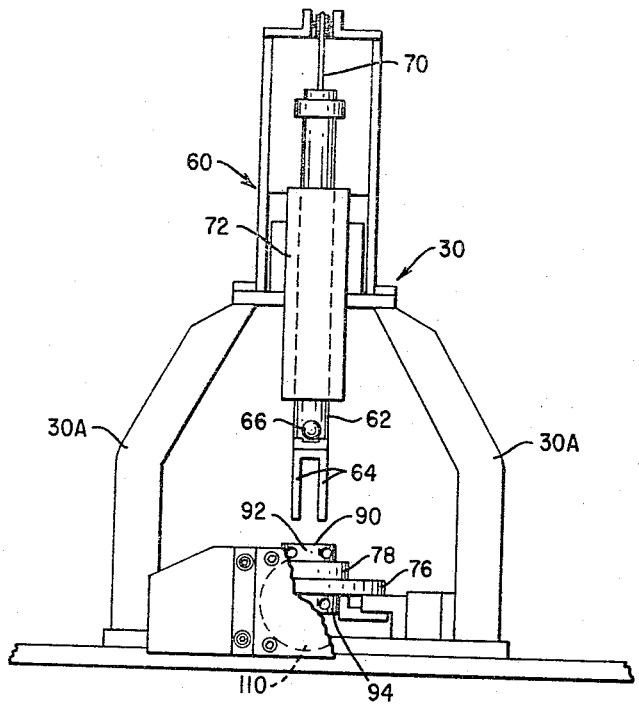
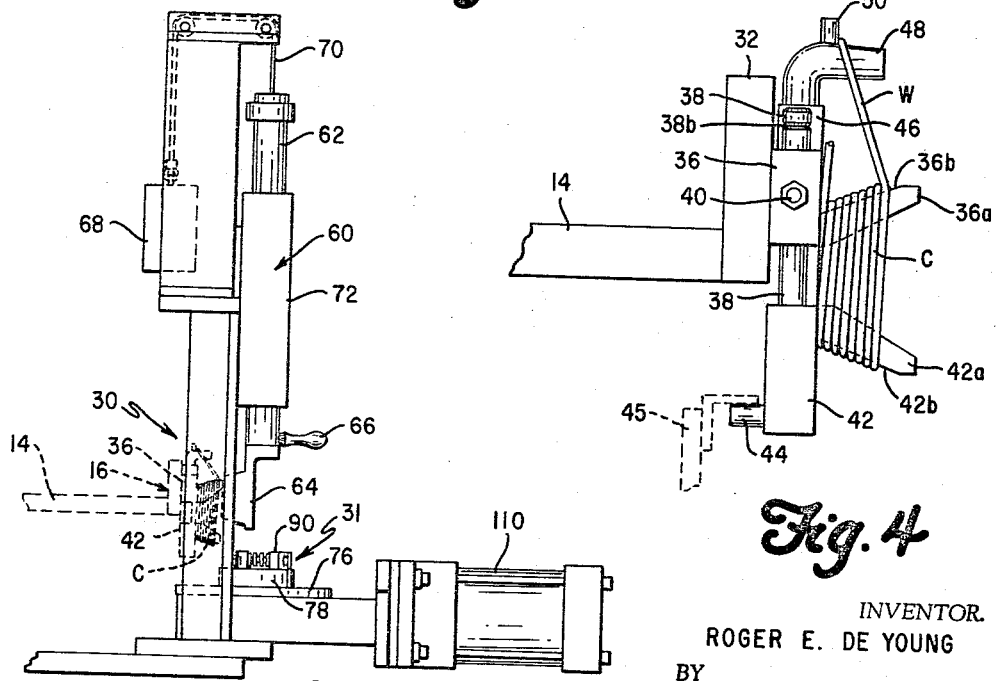
INVENTOR.
ROGER E. DE YOUNG
BY
Souther, Stottenburg & Barr
ATTORNEYS

INVENTOR.
ROGER E. DE YOUNG
ATTORNEYS

July 18, 1967  R. E. DE YOUNG  3,331,403
STATOR COIL WINDING AND POSITIONING MACHINE
Filed July 23, 1964  5 Sheets-Sheet 4
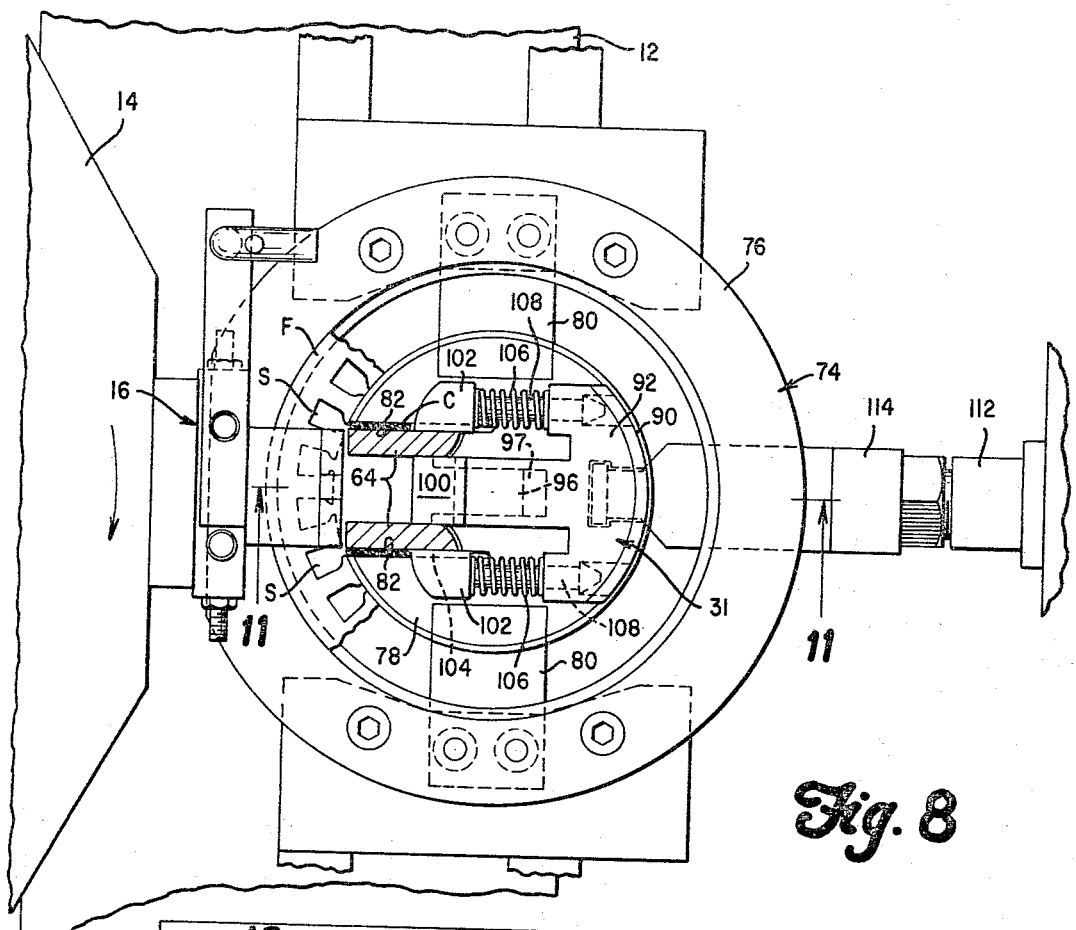
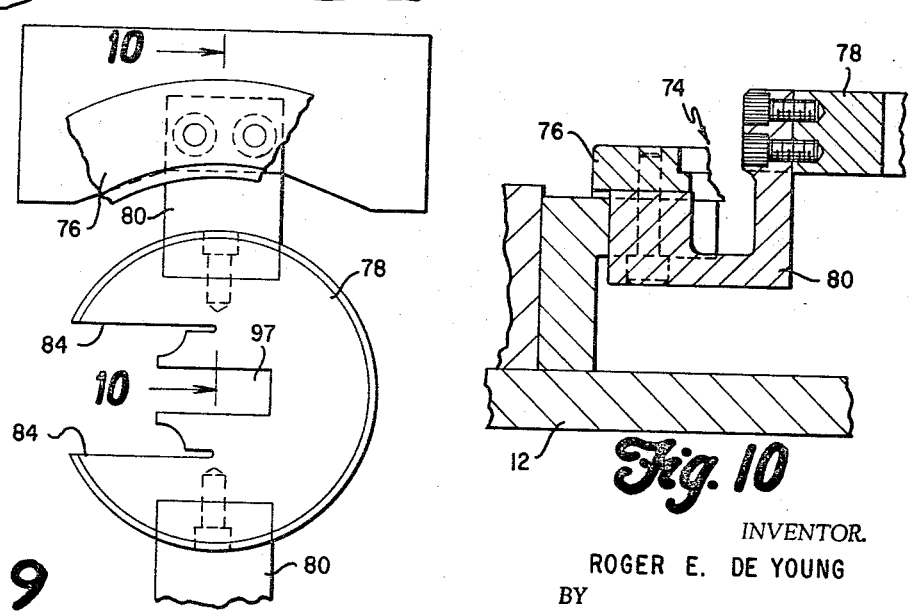
INVENTOR.
ROGER E. DE YOUNG
BY
Souther, Stottenberg & Barr
ATTORNEYS

INVENTOR.
ROGER E. DE YOUNG
BY
ATTORNEYS

United States Patent Office 3,331,403
Patented July 18, 1967

3,331,403
STATOR COIL WINDING AND POSITIONING MACHINE
Roger E. De Young, Lambertville, Mich., assignor to Eltra Corporation, Brooklyn, N.Y., a corporation of New York
Filed July 23, 1964, Ser. No. 384,719
4 Claims. (Cl. 140—71)

This invention relates to coil winding methods, more particularly to an improved method of and machine for winding alternator stator coils including means to remove already wound coils from a winding form for transference and insertion of the coils in predetermined relative positions in the slots of alternator stator frames.

The invention contemplates an adjustable winding form to provide coils of various sizes which is wound with wire positioned in a uniform layer winding on a tapering form to progressively increase the length of wire in each successive convolution of the coils. This provides sufficient slack in the wires of the two oppositely disposed end coil portions in the individual convolutions thereof to facilitate bending of two oppositely-disposed projecting end portions of completed coils outside of the stator slots when assembling individual coils in a stator frame to thereby provide ample space adjacent the faces of the stator for subsequent coils to be inserted in said frame.

The invention further contemplates a method of and a mechanism for transferring wound coils from the winding form and inserting the coils in the slots of an alternator stator frame using a simple mechanical means suitable for manual manipulation to maintain the wound coils in a predetermined configuration during transfer thus facilitating the assembly and insertion of the coils through the relatively small area at the throat of a stator core slot to minimize injuries to the wire and/or insulation thereon.

The invention disclosed herein relates to improvements on machines disclosed in U.S. Patent No. 2,861,601 granted to R. G. Marzolf.

Heretofore coil winding machines of the type disclosed in said patent were not provided with mechanical means to transfer wound coils from the winding forms to slots in alternator stator frames, which operation was carried out manually by the operator. In the winding forms on the type disclosed random winding of the individual convolutions of the coil caused an operator to "finger" the individual convolutions to insert them into stator slots, resulting in a tedious, time-consuming operation. Moreover, the manual manipulation of removing the coils from the winding form and inserting them into the slots of the stator frame, increased the possibility of injury to the wire or the wire insulation, resulting in numerous rejects due to faults in the windings. In an attempt to obviate these and other objections complicated automatic machines have been developed to wind and position coils on alternator stator frames, but these machines are far too costly for use with relatively small production quantities. Furthermore, when the manufacture involves small production quantities, it is desirable to limit the number of winding machines to a minimum with changeable forms and parts to be able to wind several different sizes of alternators. The complicated automatic machines referred to above are not easily or economically adaptable to winding the various sizes of coils required for this purpose.

It is, therefore, a principal object of this invention to provide a coil winding machine for producing alternator stators which has improved characteristics incorporated therein suitable for use with small-production manufacturing operations.

It is another object of this invention to provide an improved winding form for a coil winding machine which will produce a coil having tapering characteristics to vary the dimensions of the individual convolutions of wire of the coil to facilitate the assembling of the coils in the limited space in an alternator stator, particularly adjacent the sides of the stator core.

It is still another object of this invention to provide an improved method of transferring wound coils from the winding form to the related core slots in a stator frame using a transfer device for the coils which maintains the wound coils in a predetermined configuration.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

In the drawings:

FIG. 2 is a front elevation of a portion of the machine incorporating the invention;

FIG. 3 is a side elevation of FIG. 2;

FIG. 4 is a side elevation of an improved winding form utilized in the machine;

FIG. 8 is a top plan view, partly in section, of a portion of the machine showing the operating relation of some of the elements of the machine with the stator frame to be wound;

FIG. 9 is a top plan view of a part of the construction shown in FIG. 8;

FIG. 10 is a sectional elevation taken on line 10—10 of FIG. 9;

Figure 1:
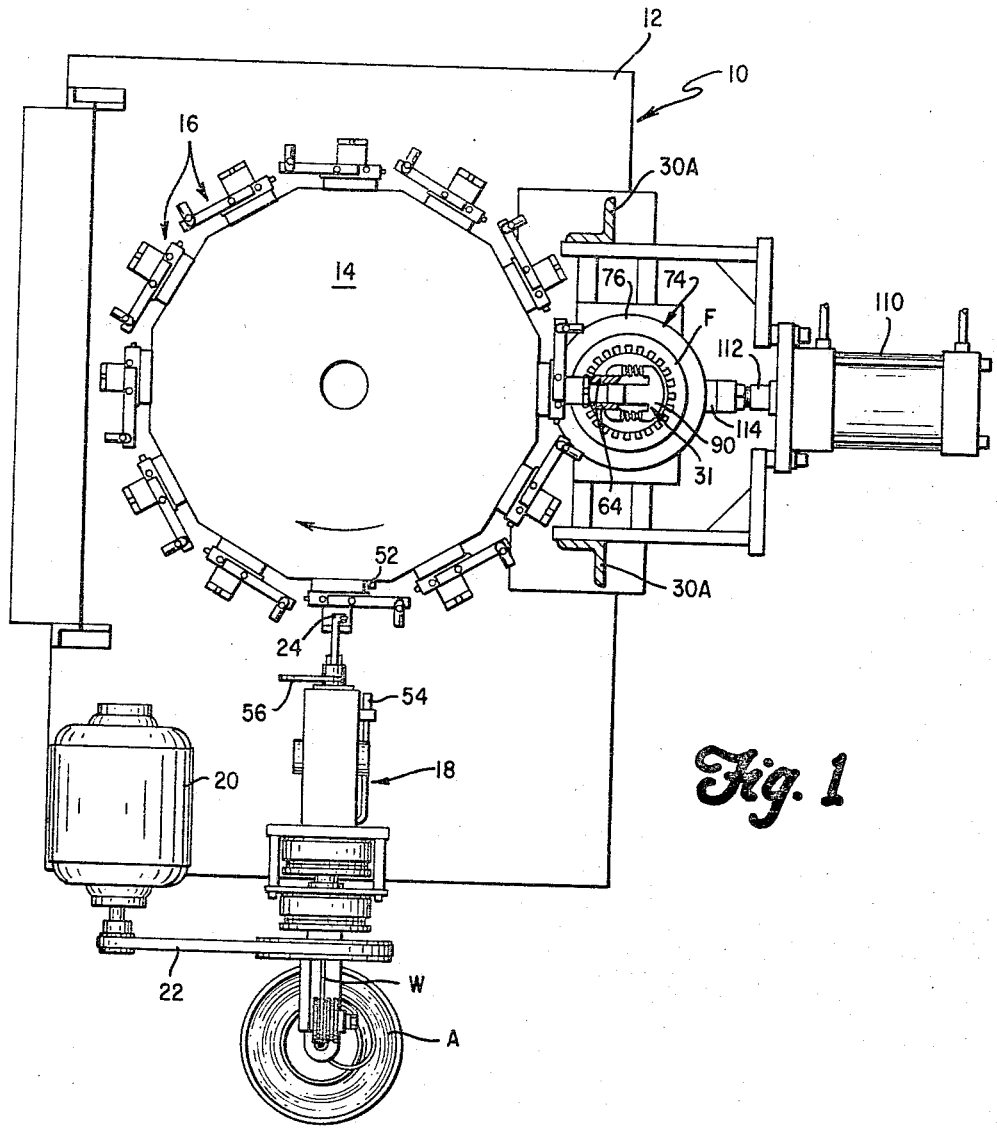
FIG. 1 is a top plan view of the machine with a portion of a transfer mechanism broken away.
Figure 5:
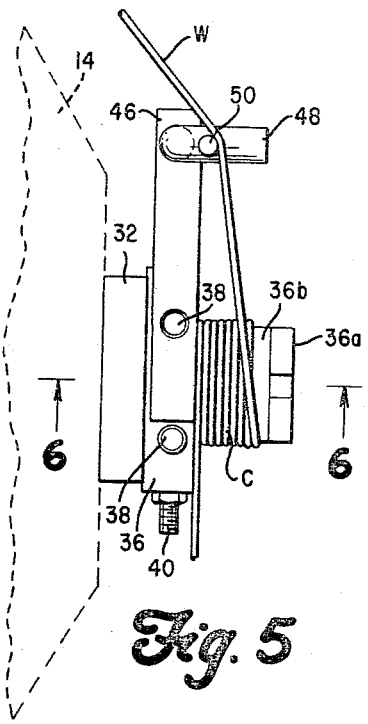
FIG. 5 is a top plan view of the improved winding form.

Referring to the drawings, particularly FIG. 1, winding machine 10 is provided comprising a stationary mounting table 12, a rotatable turret mechanism 14 capable of being indexed to various operating positions having a plurality of winding forms 16 mounted thereon at spaced angular positions, a wire winding mechanism 18, and a motor 20 drivingly connected to the machine by a belt 22. The motor 20 provides the driving means for the winding mechanism 18 and a pneumatic drive may be provided for the rotatable turret 14, the turret being rotated in a clockwise direction (as viewed in FIG. 1) by an indexing mechanism not shown. A wire W is threaded through the winding mechanism 18 from a source of supply A to a winding head 24 which is rotated to wind the wire on the winding forms 16. The driving mechanisms for winding the wire and indexing the turret will not be described further in detail since they are no part of this invention and are substantially the same as that disclosed in the Marzolf patent identified above.

The important features of the invention relate to the winding forms 16, a coil transfer mechanism 30 cooperating with the stator core, the details of which will now be described.

Figure 6:
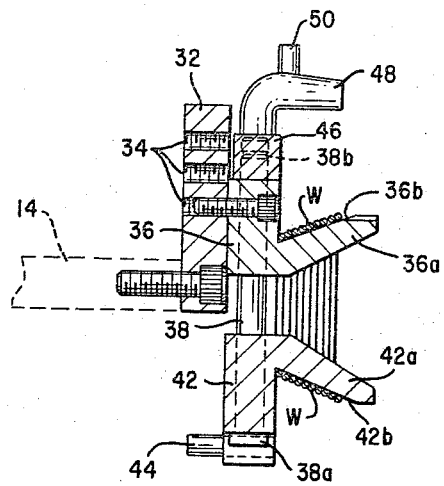
FIG. 6 is a sectional elevation taken on line 6—6 of FIG. 5.
Figure 7:
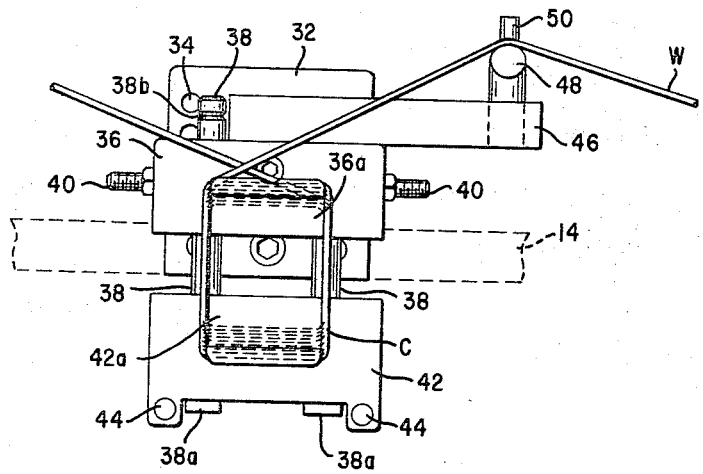
FIG. 7 is a front elevation of the winding form.

The winding forms are twelve in number and are mounted on the perimeter of the turret 14 in spaced angular relation all of which are identical in construction. Only one will therefore be described in detail being shown in the drawings in FIGS. 4 through 7. In FIG. 4 of the drawings, a bracket 32 is provided which is suitably attached to the peripheral flattened edge of the turret 14, and is provided with a plurality of vertically spaced threaded apertures 34 (FIG. 6) to provide a vertical adjustment for the winding form consisting of an upper form member 36 which is mounted to the bracket 32 in a predetermined stationary position and a lower member to be described hereinafter. The member 36 has two vertically-disposed spaced pins 38 adjustably positioned in suitable bores therein, each pin being provided with a lower integral head portion 38a, and a plurality of annular grooves 38b formed in the opposite upper ends. The grooves 38b provide a locking means when the pins 38 are vertically adjusted in the member 36, the pins being maintained in a given locked position by having the inner ends of the oppositely disposed bolts 40 clamp into the grooves 38b in a well known manner. The vertical adjustment of the pins 38 in the vertical bracket 32 provides a means for holding a lower form member 42 in cooperative relation with the upper coil form 36 for winding coils of different sizes for the various sizes of alternators.

Slidably positioned on the vertical pins 38 is the lower form member 42 which rests in winding position in its lowermost position (FIG. 7) on the heads 38a of the pins. The purpose of the sliding relation of the member 42 will be better understood hereinafter. Since the lower form member 42 is slidable on the pins 38, it is necessary to provide a lock or holding means to maintain it in its lowermost position during a winding operation. This is accomplished by providing a pair of oppositely-projecting pins 44 at the bottom of the member 42 (FIGS. 4 and 7) which cooperates with a fixed holding device 45 in the form of an angle iron shown in phantom in FIG. 4, which is mounted on the machine table 12 at a suitable height at the wire winding position, so as to hold the lower form member against the heads 38a during a winding operation.

Both of the upper and lower winding forms 36 and 42 have integral forwardly-projecting portions 36a and 42a (FIGS. 4 and 6) which have coil forming divergent surfaces 36b and 42b inclined in opposite directions. The angles of divergency of the surfaces with a horizontal plane are identical and are predetermined to provide sufficient variation of wire length in consecutive convolution of wound in touching relation so that the projecting ends of the coils outside of the stator slots can be bent or rolled over without undue binding to facilitate assembling the many coils in the limited space at the ends of a stator frame, which will be better understood hereinafter. The sides of the projecting portions 36a and 42a are in vertical alignment, one over the other, so that the opposing sides of a wound coil C (FIG. 7) are in parallel relation.

To facilitate the winding operation, wire guide and support means are provided on each winding form mechanism to guide the intervening wire portion from one winding form to another as the turret rotates. The guide means comprises a laterally-extending horizontal bar 46 on the end of which a forwardly-projecting guide post 48 is mounted extending into the winding plane which is provided with a vertical guide pin 50 projecting upwardly from the post. The post 48 is of rounded conformation and maintains the wire in a fixed position above the winding form to make it available to the operator and to provide a given amount of slack required between coils. The guide pin 50 on the post 48 maintains the wire in a predetermined angular relation to place the wire in alignment with the next winding form as the turret 14 rotates (FIG. 5) past the winding mechanism 18.

When the coils are being wound an electronic counter mechanism or other suitable means controls the mechanism to provide the predetermined number of turns of wire in each coil. The counter mechanism consists of a pair of aligned cooperating photo-electric members 52 and 54 (FIG. 1), and a light blocking shield 56, which is mounted on and rotated by the winding mechanism 18 in a path between the photo-electric members 52 and 54 to make and break an electric circuit to a counter device (not shown) in a manner well known to those experienced in the art.

When the turret 14 is rotated during the operation of the machine empty winding forms 16 are successively positioned at the winding mechanism 18 so that a coil may be wound on each in succession. Simultaneously, the winding forms having completed coils wound thereon are successively positioned at the coil transfer device 30 where the coils are removed by manual operations. The coil transfer device 30 is designed to cooperate with the coil winding form 16 by a coil holding form 64 at the level of the turret 14, the coil being transferred from the winding form 16 to the holding form 64 by the hands of the operator. The holding form 64 is mounted on the lower end of vertically slidable shaft 62, which is counterbalanced by weight 68 attached by cable 70 so that the holding form 64 can be readily moved by the operator by handle 66 (FIG. 3) to a lower level where the coils are inserted in the slots of a stator block. The whole mechanism is suitably supported on the table 12 by vertical struts 30A and framework 60 on which is mounted guide block 72, to guide the vertical shaft 62.

In the operation of the transfer device 30, the form 64 is first moved to the upper position (FIG. 3) to be in alignment with the member 36 of the winding form. The operator using both hands grasps the coil C on the winding form on opposite sides and simultaneously, using the little finger of each hand, collapses the winding form by pushing up on the lower winding form member 42. This provides clearance within the coil to slide the coil manually from the winding form onto the transfer form 64 aligned therewith. While holding the coil on the transfer form with one hand the operator lowers the transfer form with the other hand, using handle 66, to a position to clear the bottom of member 42. While holding the members in this position a foot pedal (not shown) is depressed to index the turret clockwise and place another coil in transfer position. This provides sufficient slack in the wire lead between the coil on the transfer form and the next coil on a winding form to continue lowering the transfer form 64 to a position within a stator frame F (FIGS. 1, 8 and 11), an operation which is then carried out.

The stator frame F is held in a fixed position, with relation to the transfer device 64 by a holding fixture 74 which is suitably mounted in a permanent position on the table 12 of the machine. The fixture 74 comprises a stator holding ring 76 (FIGS. 8, 9 and 10), and a dual purpose guide block 78 which is centrally mounted within the fixture using oppositely disposed bridge members 80 (FIG. 9). The guide block 78 provides two guide slots 82, formed by the outer walls of the transfer form 64 and inner walls 84 of the guide block, being slightly larger than the wire diameter so as to maintain the two parallel sides of the coil in flattened, aligned relation with adjacent slots S in the stator frame preparatory to a coil inserting operation. As has already been pointed out, the transfer form 64 moves into cooperative relation with the guide block 78 from above with a coil positioned on the transfer form as described. The coil is by this action positioned in the slots 82 with the wires of the coil in a single layer, preparatory to insertion into the selected core slots of the stator core F, whose relatively narrow openings are aligned with the slots 82.

The guide block 78 also serves as a mounting means and guide for a horizontally movable portion of the coil inserting mechanism 31, which is also mounted within the holding fixture construction 74. During the operation of the machine, the stator frames to be wound are manually mounted and rotated within the holding fixture to align predetermined slots S with the slots 82 for each coil inserting operation.

Figure 11:
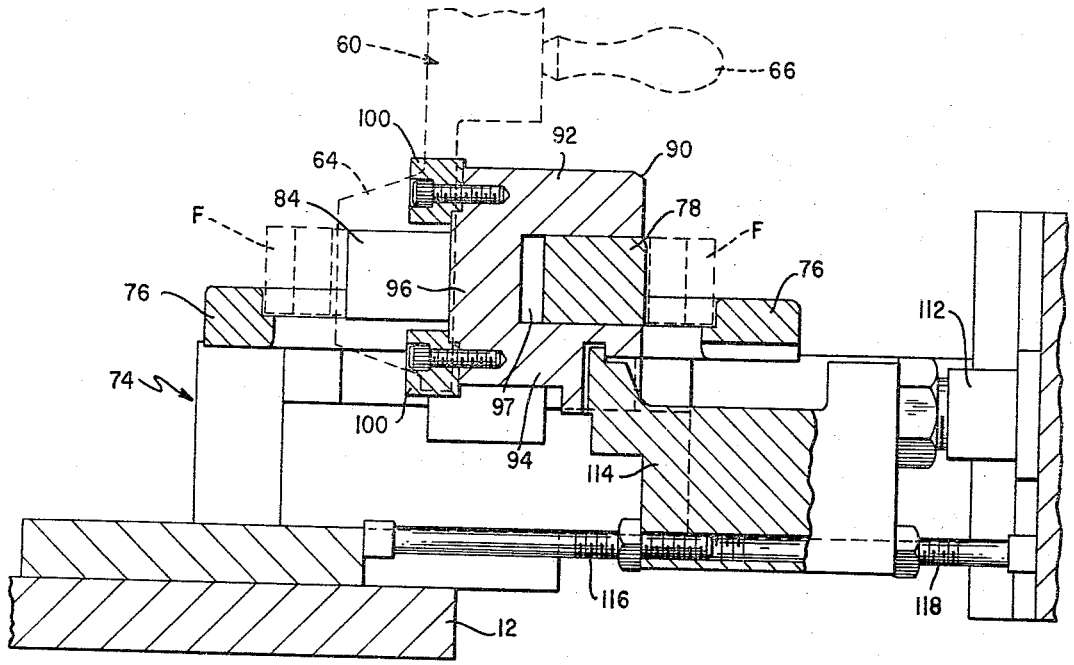
FIG. 11 is a sectional elevation taken on line 11—11 of FIG. 8.
Figure 12:
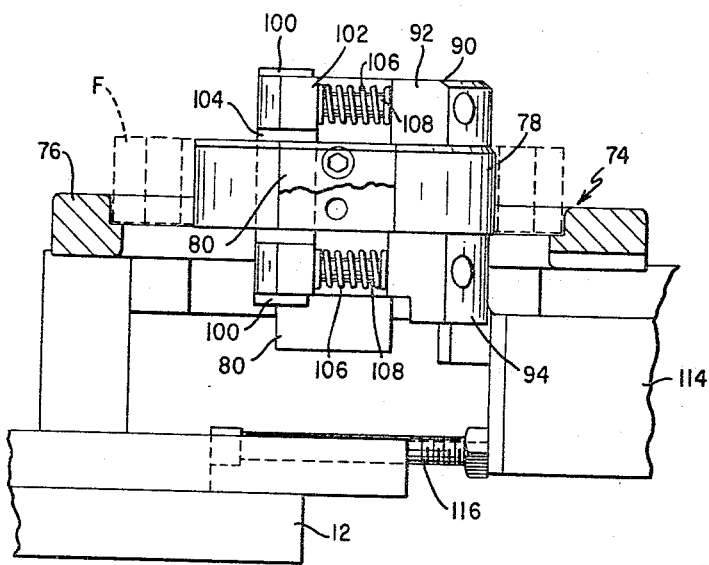
FIG. 12 is an elevational view, partly in section, of a portion of the construction shown in FIG. 8.
Figure 13:
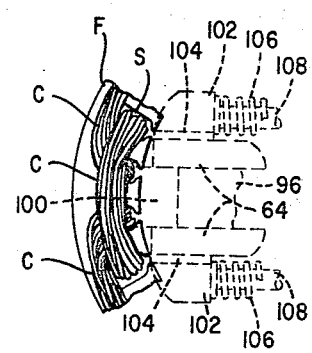
FIG. 13 is a top plan view of a fragment of a wound stator showing the relationship of a portion of the inserting mechanism in an inserting position.

The coil inserting mechanism 31 (FIGS. 8, 11 and 12) includes a sliding block 90 which is formed with upper and lower portions 92 and 94, respectively (FIGS. 11 and 12), which are interconnected with an integral portion 96 (FIG. 11). The upper and lower portions are spaced to be in sliding contact with top and bottom surfaces of the guide block 78, the integral portion 96 extending through the block 78 in a vertical slot 97 formed therein. The block 90 is also provided with upper and lower bumper extensions 100 which are centrally located on the block, one over the other, to contact the top and bottom end loops of the windings of the coil during the inserting operation. The purpose of the bumper members 100 is to push or roll over the top and bottom end portions of the coils outwardly toward the periphery of the stator to insure space for the overlapping of the exposed end portions of the coils subsequently inserted. Since all of the coils are inserted in the same fashion the exposed end portions of the assembled coils will follow somewhat the same curvature as the stator frame and thus provide clearance for a rotor in a final alternator assembly.

The coils are pushed or inserted into the stator slots by two pusher members 102 which are resiliently mounted on the slide block 90. Each have a pair of head-like portions connected by a flat bar 104 which extends across to fill the guide slots 82 to be in contact with the adjacent turns of the two parallel sides of a coil positioned in the slots. The pusher members are resiliently mounted to the slide block with compression springs 106 loosely positioned on guide pins 108. This construction provides a resilient stop for the pusher members against the inserted windings of a coil and allows the slide block 90 and bumpers 100 to continue to the left (as viewed in drawings) a slight additional distance to form the top and bottom end portions of the coils as described hereinbefore. The resilient stop also provides a safety feature to prevent damage to the machine or the coils in the event the coils jam or the stator slots are not in proper alignment with the inserting mechanism.

The coil inserting mechanism 31 is actuated in a forward direction to insert the coil sides in the stator slots by advancing the bars 104 through the slots 82 and is retracted to its original position by a double-action fluid cylinder 110 which is controlled by a valve actuated by a foot pedal (not shown). The cylinder body is mounted to the machine in a stationary position and a piston shaft 112 of the cylinder is connected to the slide block 90 by an adjustable connecting block 114 (FIGS. 8 and 11). The adjustment block 114 is provided with two threaded stop members 116 and 118 with locknuts which can be adjusted to limit the maximum travel of the block 114 and the slide block 90 in either direction. The adjustment 116 can be varied to control the amount of rollover of the exposed ends of the coils by the bumpers 100. The adjustment 118 is necessary to limit the return travel of the slide block 90 so that a portion of the slide block does not extend over the outer edge of block 78 and hamper removal or insertion of stator frames.

It is to be remembered that the winding form assemblies 16, the transfer device 30, the stator holding fixture 74, and the coil inserting mechanism 31 are all designed to be either adjusted or provided with interchangeable parts and still use the same basic machine to produce wound stators to satisfy the size requirements for the various sizes of alternators.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a coil winding and positioning machine, a collapsible winding form, means to wind a predetermined number of turns on the form at one position, means at the first position to prevent collapse of the winding form, vertically movable coil transfer means at a second position, means to move the form with its coil to the second position into alignment with the coil transfer means for transfer of the coil thereto by manual manipulation, means to hold a stator core to be wound below the second position to be aligned with the coil transfer means during its vertical movement, means cooperating with the coil transfer means forming a portion of the stator holding means to guide the coil sides into the slots of the stator core, and horizontally movable means to move the coil sides into the core slots.

2. In a coil winding and positioning machine, a collapsible winding form, means to wind a predetermined number of turns on the form at one position, means at the first position to prevent collapse of the winding form, vertically movable coil transfer means at a second position, means to move the form with its coil to the second position into alignment with the coil transfer means for transfer of the coil thereto by manual manipulation, means to hold a stator core to be wound below the second position to be aligned with the coil transfer means during its vertical movement, means cooperating with the coil transfer means forming a portion of the stator holding means to guide the coil sides into the slots of the stator core, horizontally movable means to move the coil sides into the core slots, and means combined with the horizontally movable means to contour portions of the coil when the coil is positioned in the core slot.

3. In a coil winding and positioning machine, a collapsible winding form, means to wind a predetermined number of turns on the form at one position, means at the first position to prevent collapse of the winding form, vertically movable coil transfer means at a second position, means to move the winding form with its wound coil to the second position into alignment with the coil transfer means for transfer of the coil thereto by manual manipulation, means to hold a stator core to be wound below the second position to be aligned with the coil transfer means during its vertical movement, means cooperating with the coil transfer means forming a portion of the stator holding means to hold the coil sides in a single layer and guide the coil side into the slots of the stator core, and horizontally movable means to move the coil sides into the core slots.

4. In a coil winding and positioning machine, a collapsible winding form, means to wind a predetermined number of turns on the form at one position, means at the first position to prevent collapse of the winding form, vertically movable coil transfer means at a second position, means to move the winding form with its already wound coil to the second position into alignment with the coil transfer means for transfer of the coil thereto by manual manipulation, means to hold a stator core to be wound below the second position to be aligned with the coil transfer means during its vertical movement, means cooperating with the coil transfer means forming a portion of the stator holding means, to hold the coil sides in a single layer and guide the held coil side into the slots of the stator core, horizontally movable means to move the coil sides into the core slots, and means combined with the horizontally movable means to form the enl portions of the coil projecting outside of the stator core slot when the coil is positioned in the slot.

References Cited

UNITED STATES PATENTS

| | | | |
|---|---|---|---|
| 1,088,126 | 2/1914 | Clark | 140—92.2 |
| 2,143,315 | 1/1939 | Hanson | 140—92.2 |
| 2,154,595 | 4/1939 | Weirich | 140—92.2 |
| 2,261,199 | 11/1941 | Wilson | 140—92.2 |
| 2,514,251 | 7/1950 | Moore et al. | 140—92.2 |
| 2,712,836 | 7/1955 | Marzolf | 140—92.1 |
| 2,861,601 | 11/1958 | Marzolf | 140—92.1 |

WILLIAM J. STEPHENSON, *Primary Examiner.*